Jan. 15, 1957   B. BARÉNYI   2,777,728
MOTOR VEHICLE ACCESSIBLE BY MEANS OF A PIVOTAL CAP
Filed Oct. 7, 1952   4 Sheets-Sheet 1

Jan. 15, 1957     B. BARÉNYI     2,777,728
MOTOR VEHICLE ACCESSIBLE BY MEANS OF A PIVOTAL CAP
Filed Oct. 7, 1952     4 Sheets-Sheet 2

Inventor
Bela Barenyi
By Dicke and Paлллм
attorneys

Jan. 15, 1957  B. BARÉNYI  2,777,728
MOTOR VEHICLE ACCESSIBLE BY MEANS OF A PIVOTAL CAP
Filed Oct. 7, 1952  4 Sheets-Sheet 4

Inventor
Bela Barényi
By Richard Padlon
Attorneys

United States Patent Office

2,777,728
Patented Jan. 15, 1957

2,777,728

MOTOR VEHICLE ACCESSIBLE BY MEANS OF A PIVOTAL CAP

Béla Barényi, Stuttgart-Rohr, Germany, assignor to Daimler-Benz Aktiengesellschaft, Stuttgart-Unterturkheim, Germany Application October 7, 1952, Serial No. 313,559

Claims priority, application Germany September 23, 1949

7 Claims. (Cl. 296—28)

The present application is a continuation-in-part application of my following copending applications, all of which have become abandoned:

Application Serial No. 186,156, filed September 22, 1950, entitled "Chassis, Particularly of Motor Vehicles."
Application Serial No. 186,157, filed September 22, 1950, entitled "Motor Car" and
Application Serial No. 190,761, filed October 18, 1950, entitled "Motor Vehicle."

The subject matter of my prior copending application Serial No. 139,609, filed January 20, 1950, entitled "Re-inforced Floor Plate for Body of Sectional Automobile" now Patent No. 2,710,222 is also incorporated by reference into this application.

My invention relates to a motor vehicle, and more particularly to an automobile of the coupe type having a streamlined body encasing the wheels.

Streamlined bodies of known vehicles of that type are so designed that their largest longitudinal and transverse dimensions are located substantially in the plane of the floor, that is to say at a level determined by the required road clearance. Such a body, however, is unsatisfactory for a number of reasons. Difficulties are encountered in accommodating the various units, such as the engine block, the axle transmission etc. An efficient utilization of the space enclosed by the body is difficult. Also the aero-dynamic properties are unsatisfactory.

It is one of the objects of my invention to avoid such disadvantages and to create a body which combines a minimum of air resistance with the possibility of efficiently utilizing its space for the accommodation of the driving unit, the fuel tank etc. More particularly, it is an object of my invention to provide for a body in which the engine block, the transmission units, the electrical equipment, the spare tire, the fuel tank, a tank space etc. may be arranged and located in a practical compact manner and in which the passenger space has its greatest width at elbow level, so as to afford a maximum of comfort and convenience to the driver and the passengers.

Further objects are to eliminate the necessity of providing a closed car with doors; to reduce the height of the vehicle; to produce a small car of the coupe type which may be composed of cellular elements; and to create a small and inexpensive closed car adapted to accommodate either the driver alone or one or two passengers seated at the side of the driver; and to provide a closed car which while having a comparatively high chassis of a rugged structure may nevertheless have a low floor and a low roof, thus limiting the total height to a minimum. In order to obtain such objects, I design the upper section of the closed body as a cap which being hinged to the body may be swung to opened position, thus permitting the driver or passenger to enter or leave the car. The hinge extends preferably transversely of the body either in front of or behind the passenger space, i. e. near the front end or near the rear end of the body and is preferably carried by a side bar.

The liftable cap may be provided with windows or the like and I prefer to make the cap in part or in toto of a transparent material, for instance of "Plexiglas."

A further object of the invention is a side wall comprising chassis girders having a cross-section of comparatively high vertical dimensions, whereby a rugged and rigid structure is obtained without adversely affecting the accessibility of the passenger space or without requiring an increase of the height of the vehicle or a necessity to provide doors.

In order to facilitate the operation of swinging the cap to opened position, the weight of the cap may be compensated for entirely or in part by a spring-controlled mechanism including torsional springs, traction springs or pressure springs, a Nuremberg scissors or the like. Such mechanism may be so spring-controlled as to first produce a limited lifting force at the commencement of the lifting operation and an increasing lifting force when the cap approaches a median position which lifting force decreases towards the end of the lifting movement. In this manner the mechanism may be so controlled as to cause the cap, as soon as the driver has lifted it a little, to automatically spring into its opened position. In order to facilitate the lifting of the cap, the latter may be provided with handles, such handles serving at the same time to unlock the cap. Handle bars may serve as fender bars for the protection of the vehicle at the same time.

Other objects of my invention are to build up the body of separate individual sections or cells; to provide improved means for connecting such sections, the latter being so designed that the front sections and the rear sections may be readily attached to and detached from the central section; to provide for cushioning means inserted between the different sections for the purpose of absorbing shocks and vibrations; and to provide for a possibility of installing parts of identical shape at both ends of the central section, so as to reduce the number of spare parts to be kept in stock and so as to reduce the cost of manufacture of the car.

A further object of the invention is to provide a suitable mounting and an elastic suspension of an axle and/or the driving aggregate of the vehicle.

Further objects of my invention are to provide a chassis or floor assembly of vehicle bodies, and more particularly a body assembly comprising a floor panel having one or two slanting extensions and at least one longitudinal re-inforcing girder, said assembly being simple in design and having a low weight and a rugged structure.

Other objects of my invention are to provide such a structure of said assembly as to allow a maximum of space and a low center of gravity.

Preferably I place a longitudinal central girder in toto or in part on top of the floor panel, thus securing the advantage that, with a given road clearance, the floor panel and consequently the center of gravity are located on the lowest possible level. In addition to the central girder I may provide lateral longitudinal girders preferably confining the body space on its outside. A high rigidity will result from making the cross sectional profile of the lateral girders higher than that of the central girder. The unit comprising the floor panel and the central girder re-inforcing the same both provided with upwardly slanting extensions may constitute a floor unit carrying a separate body or may constitute part of a self-supporting body.

Moreover, the re-inforcing girder may be manufactured as a hollow girder independently of the floor panel or may be made as a channel beam closed by the floor panel so as to constitute a hollow girder.

According to another feature of my invention the floor panel which may form part of the self-supporting body of the vehicle is comprised of two sections abutting the central girder laterally and rigidly connected therewith in a suitable manner, for instance, by means of longitudinal vertical flanges welded to the girder. My invention results in a simple structure inexpensive to manufacture and capable of easy assembly. When applied to bodies composed of cellular units, the slanting extensions of the central girder which are preferably symmetrical with respect to a transverse vertical central plane may serve to attach the end cells, i. e., the body end sections, and to suspend the wheels.

For the purpose of attaining such and other objects I have provided novel and improved means which will be described hereinafter with reference to a preferred embodiment of my invention illustrated in the accompanying drawings and the features of novelty will be pointed out in the claims.

In the drawings

The body A of the car shown in each of the figures comprises a front section $a$ enclosing the front wheels, a rear section $b$ enclosing the rear wheels and a central section $c$ connecting the sections $a$ and $b$. The section $c$ may include lateral longitudinal girders having comparatively large vertical dimensions and a floor panel connected therewith and reinforced by suitable means. More particularly, the body section $c$ of the vehicle may be constructed as originally disclosed in my copending patent application, Serial No. 186,156, filed September 22, 1950, entitled "Chassis, Particularly of Motor Vehicles," now abandoned, and corresponding to an application filed in Germany on 23rd September 1949, the subject matter of which is incorporated into the present continuation-in-part application and which discloses the combination of a floor panel having slanting front and rear extensions and a central longitudinal girder having slanting front and rear extensions united with the floor panel.

The liftable cap B comprises side wall sections $d$, an upper bridge section $e$ connecting the sections $d$ and located substantially above the dash-board of the vehicle, and a hood $f$ confining the passenger's space at the top and consisting, for instance, of a transparent material. If desired, the entire cap including the elements $d$, $e$ and $f$ may be made of the same material.

Figure 1:
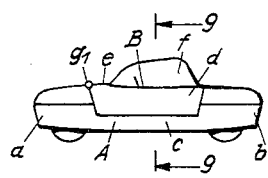
Fig. 1 is an elevation of a coupe provided with a liftable cap hinged to the front section of the body, said cap being shown in closed position.
Figure 2:
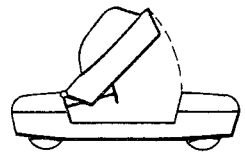
Fig. 2 is a view of the same vehicle with the cap in lifted position.

In the embodiment illustrated in the Figs. 1 and 2 the section $c$ of the cap is hinged to the rear edge of the front section $a$, the hinge being indicated at $g_1$.

Figure 3:
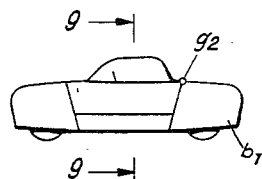
Fig. 3 is an elevation of a car similar to that of Fig. 1, but differing by the cap being hinged to the rear section of the body.
Figure 4:
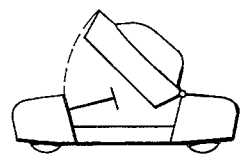
Fig. 4 shows the vehicle of Fig. 3 with the cap lifted.

In the embodiment shown in Figs. 3 and 4 the hinge $g_2$ of the cap is located at the front edge of the rear section $b_1$ of the body. Hence, the cap of the vehicles shown in Figs. 1 and 3 may be swung to opened position as shown in Figs. 2 and 4. In lieu of a single hinge, two co-axially arranged hinges may be provided on either side of the body as will be readily understood. The hinge is located substantially on the level of the lower edge of the windshield portion of the hood $f$.

Figure 5:
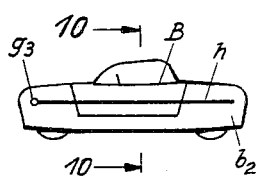
Fig. 5 is an elevation of a coupe-type car with a cap carried by fender bars hinged to the front section of the body.
Figure 6:
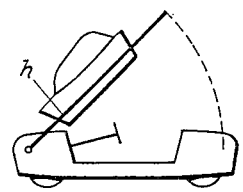
Fig. 6 shows the same car with the cap lifted.
Figure 7:
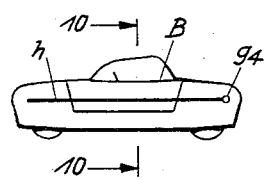
Fig. 7 shows a coupe-type car with a cap carried by fender bars hinged to the rear section of the body.

The embodiment illustrated in Figs. 5 to 8 differs from the embodiments shown in Figs. 1 to 4 by the position and arrangement of the hinge. The cap B is rigidly connected with lateral bars $h$ extending lengthwise of the body at the outside thereof, one bar at either side, such bars being pivotally connected either to the front end of the body as shown in Figs. 5 and 6 at $g_3$ or to the rear end of the body as shown at $g_4$ in Figs. 7 and 8. Owing to their lateral position, the bars may serve the triple function of guiding the cap in its lifting motion, of protecting the body when the cap is closed, and of serving as a handle for the purpose of lifting the cap from the outside.

The springs serving to carry part of the weight of the cap, thus facilitating the lifting thereof, may be arranged coaxially with the hinge or hinges or off-set therefrom. They may act on levers suitably connected with the cap or with the bars $h$. If the spring-control mechanism includes Nuremberg scissors, the latter are preferably mounted at the end of the cap opposite to the hinge, for instance between the rear body section $b_2$, and the rear end of the bars $h$ or the rear edge of the cap in the embodiment shown in Figs. 5 and 6.

When the cap is unlocked and swung into opened position, it affords easy access to the seat or seats. As stated heretofore the spring mechanism may be so designed that once the cap has been slightly lifted, it will swing upwards into the fully opened position automatically and will remain in such position.

Figure 8:
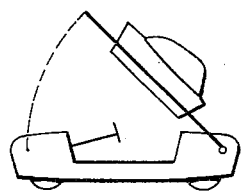
Fig. 8 shows the same car with the cap lifted.

A comparison of Figs. 2 and 4 with Figs. 6 and 8 will show that the provision of the supporting bars $h$ permits of a reduction of the angle of the swinging motion of the cap. In order to facilitate the lifting of the cap from the inside, the cap may be provided with suitable inner handles.

The hinges are preferably so designed that they permit of easy disassembly of the cap by removal of the hinge bolts, thus affording a possibility of converting the closed coupe into an open touring car. Alternatively, the connection between the bars $h$ and the cap B may be so designed as to permit of easy detachment. In that case the bars may be left in place upon removal of the cap, so that they might serve to protect the body and to form railings safeguarding the passengers or goods to be transported from accidentally falling out of the car.

Figure 9:
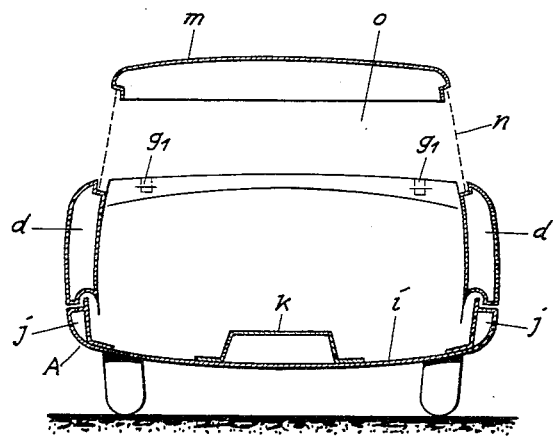
Fig. 9 is a cross-section taken along line 9—9 of Figs. 1 and 3.
Figure 10:
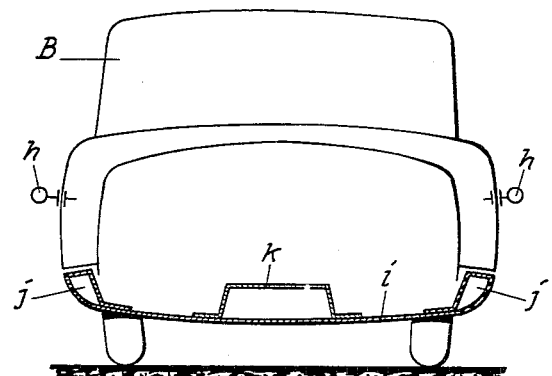
Fig. 10 is a cross-section taken along line 10—10 of Figs. 5 and 7.
Figure 11:
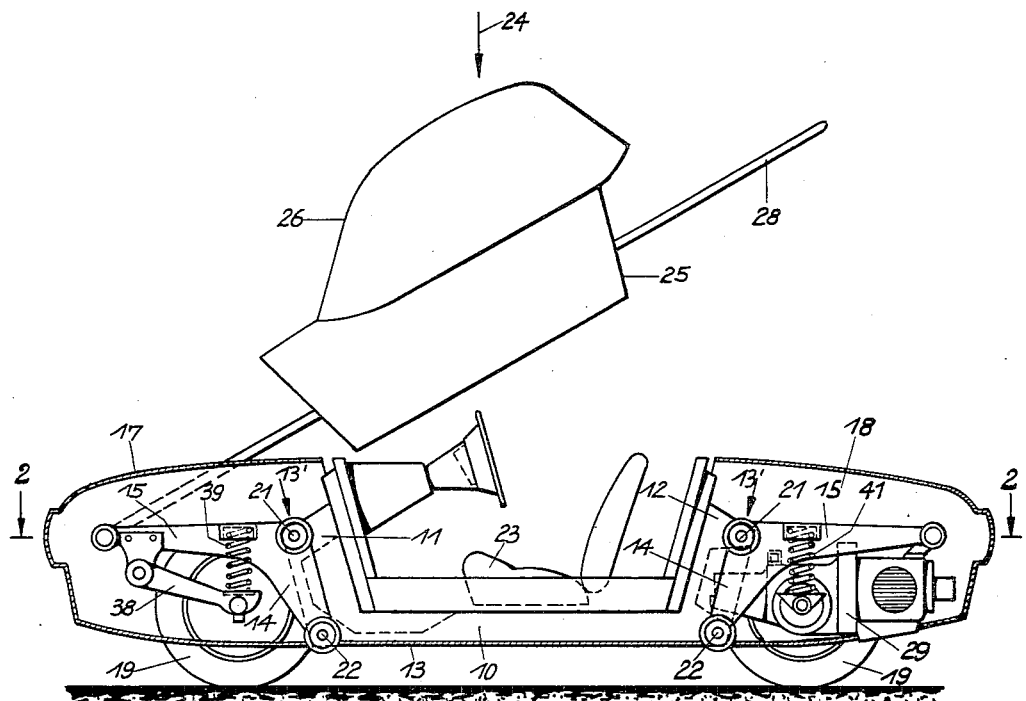
Fig. 11 is an elevation of my novel motor car, partly shown in section along line 1—1 of Fig. 12.

In Figs. 9 and 10 I have shown cross-sections of two different embodiments of the invention on an enlarged scale. As shown therein the body A includes a floor panel $i$ integral with a longitudinal central girder $k$ and two longitudinal lateral girders $j$.

An upwardly slanting extension of the panel $i$ confining the passenger space in the front thereof carries the hinges $g_1$ shown in Fig. 9 to which the cap B is attached. This cap is composed of the side wall portions $d$, of a roof portion $m$ and of window portions $n$ and $o$ of transparent material rigidly connecting the roof portion $m$ with the side wall portions $d$. The window portion $o$ shown in Fig. 9 constitutes the windshield.

As shown in Fig. 10, the cap B may be formed by an integral member of a transparent plastic attached to the bars $h$.

The body of the motor car illustrated in Figs. 11–15 comprises a central section, a front section and a rear section. First, I shall describe the central body section.

Figure 14:
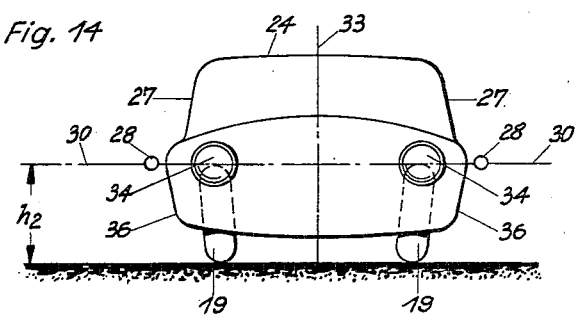
Fig. 14 is a rear view of the vehicle.
Figure 15:
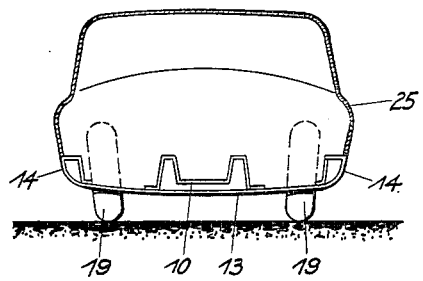
Fig. 15 is a cross-section taken substantially along line 5—5 of Fig. 13.

It consists of a central longitudinal hollow floor sill 10 provided with upwardly slanting ends 11 and 12 and of a floor panel 13, Fig. 15, which likewise has upwardly slanting end portions so arranged as to be co-extensive with the sill 10, 11 and 12 and is rigidly connected therewith by welding, riveting, or the like. Moreover, the central body section is re-inforced by lateral longitudinal hollow girders 14, Fig. 15, which may be integral with the floor panel and may extend between and abut against the upwardly slanting front and rear portions thereof. A more detailed description of the central body section of the motor car of Figures 11 to 15 is deemed dispensable herein, since it has been described herein in connection with Figures 1 to 10, the disclosure of which was originally based on my co-pending patent application, Serial No. 186,157, entitled "Motor car," filed on September 22, 1950, now abandoned, and based on a corresponding patent application, filed in the German Federal Republic on September 23, 1949, of which the present application is a continuation-in-part application.

The end sections of the body are preferably of identical shape, so as to be interchangeable. For the purpose of attaching each of such end sections to the central section of the body, I have provided a bracket of bell crank shape comprising a pair of spaced bracket members designated generally by reference numeral 13', one such member being mounted on either side of the upwardly slanting ends 11 and 12 of the central sill. Thus, there are four such bell crank members 13', two at either end of the central body section. Each of said bell crank members 13' has a downwardly extending arm 14 attached to the upwardly slanting portion 11 or 12 respectively of the floor sill and a horizontal arm 15 extending in a direction away from the central body section. Preferably, the four bell crank members 13' are identical in shape, so as to be interchangeable. The ends of the horizontal arms 15 of the bell crank members 13' are rigid, preferably integral, with a transverse bar 16. The end body section 17 or 18 respectively, which is formed by a sheet metal shell encasing the bracket 13', 16 and the wheels 19 is fixed to the ends of the transverse bar 16, the latter extending through suitable holes 20 provided in the side walls of such shell 17 or 18 respectively. It will be noted from Figs. 11 and 12 that the two end body sections 17 and 18 thus constitute wheel housings for the wheels 19, the axes of the latter extending beneath the horizontal bracket arms 15.

The wheels may be suspended by any suitable means. In the Figs. 11 and 12, the front wheels are guided on the front brackets 13' by arms 38 and sprung by helical springs 39, while the rear wheels are supported by swinging half axles 40 and sprung by helical springs 41 against the rear brackets 13'.

For the purpose of attaching the bracket members 13' to the central sill 10, 11, 12, the latter is preferably provided with laterally projecting upper studs 21 and lower studs 22 on which the downwardly extending arms 14 of the bell cranks 13' are mounted. In order to absorb vibrations, rubber cushions may be interposed between the studs 21, 22 and the bracket members 13'. Because of the slanting position of the sill end portions 11 and 12, the studs 21 will be located somewhat outward of the coordinated studs 22; they are situated substantially on the same level as the bars 16.

The central body section having slanting front and rear walls constituted by the end portions of the floor panel and having slanting side walls constituted by the girders 14 is of tub-shape. It confines the passenger space and includes the driver's seat 23. Preferably, such passenger space may be covered by a cap 24 which is integral with downwardly extending lateral side wall portions 25 and may be made of a plastic material being at least partly transparent, so as to provide for a windshield 26 and for lateral windows 27. A more detailed description of that cap is not deemed necessary, since it was fully described in connection with Figures 1 to 10, the disclosure of which is based on my original copending application, Serial No. 186,157, filed September 22, 1950, entitled "Motor Car," now abandoned, and based on an application filed in the German Federal Republic on September 23, 1949 and of which the present application is a continuation-in-part application.

Figure 12:
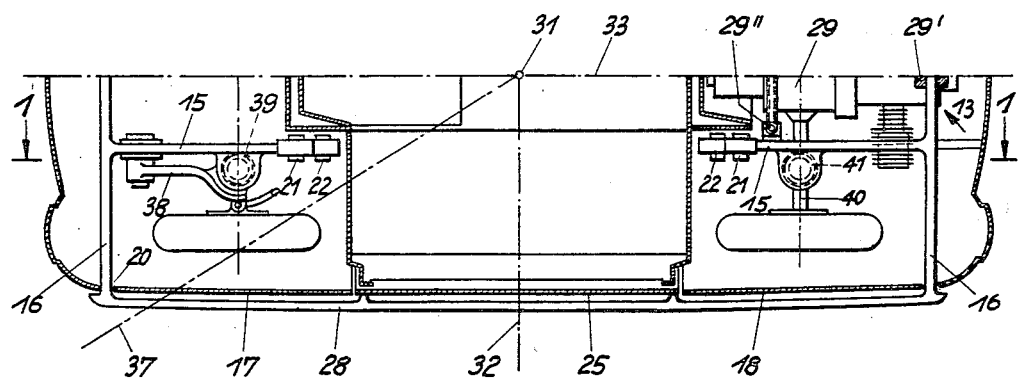
Fig. 12 is a plan view of the motor car shown in Fig. 1, partly in section along line 2—2 of Fig. 11.

Lengthwise of the body formed by the central section and the end sections 17 and 18 there extends on either side thereof a fender bar 28 which is rigidly attached to the respective side wall portion 25 of cap 24 and has its front end pivoted on the respective end of bar 16 projecting out of the front body portion 17 as shown in Fig. 12. Hence, the fender bars 28 may be swung upwardly to lift the cap 24 into the opened position shown in Fig. 11 so as to afford access to the driver's seat. When the cap is in its closed position shown, in full lines in Figs. 13 and 14 in which it covers the passenger space, the bars 28 extend horizontally.

The engine block 29 is preferably mounted within the rear body section 18 being attached by suitable means for instance in three points 29', 29" with the interposition of rubber buffers, to the rear bracket members 13' and being adapted to drive the semi-axles 40 carrying the rear wheels 19, each semi-axle being guided for instance for pivotal movement about a central longitudinal axis of the vehicle in any manner well known in the art.

By the mentioned suspending means for the wheels the weight of the body and of the engine block will be transferred to the four wheels 19. Since such wheel suspending means are well known in the art, a detailed description thereof is not believed necessary herein.

The bracket members 13' are held in position on the studs 21 and 22 by nuts (not shown) or other readily detachable means affording a possibility of easily detaching the two end body sections from the central body section.

Preferably, the body formed by the central section, the front section and the rear section has a shape which is characterized by substantially oval contours of all of its vertical longitudinal cross-sections and of all of its vertical transverse cross-sections. In referring to the body of the vehicle, however, I do not include the cap 24 thereof. More particularly, the body is so shaped as to have a greatest width and length at the level indicated at 30 in Figs. 13 and 14, such level coinciding with the plane 2—2 shown in Fig. 11, which is tangential to the top of the wheels 19. A comparison of Figs. 13, 14 and 15 will show that because of the rounded contours of the body, all of its vertical cross-sections extending through the vertical axis 31, shown in Figure 12, will have an oval contour, the axis 31 being the intersection of the transverse central plane 32 and of the longitudinal central plane 33. Thus, the vertical section taken along line 37, Fig. 12, for instance will be oval.

Moreover, it will appear that the contours of the body are symmetrical with respect to either plane 32 or 33. All of the oval vertical cross-sections of the body have their diameters of maximum length located substantially within the common plane 30. This plane is substantially on the same level as the elbows of the driver seated on the driver's seat 23 or of the passengers sitting beside the driver. Thus, a maximum of comfort and space will be afforded to the passengers.

Lamps 34 constituting the head-lights, or the tail-lights respectively, may be provided in the end sections 17 and 18, such lamps being preferably located at the level of plane 30.

At the same level, the fender bars 28 are preferably located so as to protect the body from abrasion and other damage.

Figure 13:
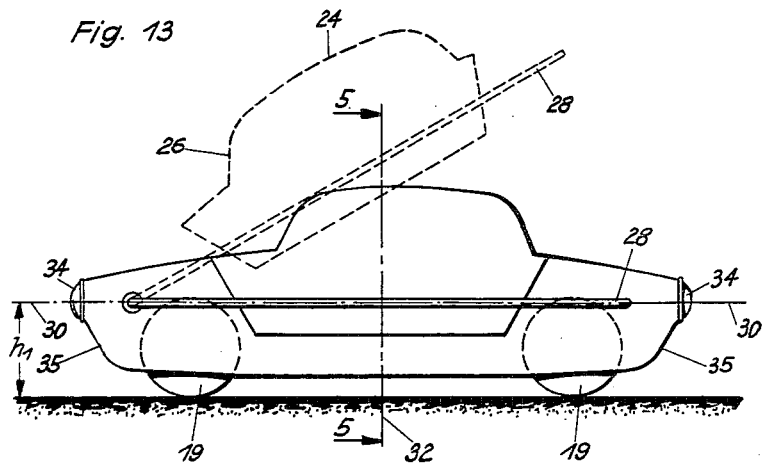
Fig. 13 is an elevation of the car shown on a smaller scale.

While I have referred to the contours of the vertical cross-sections extending longitudinally and transversely of the body as being of oval shape, such oval shapes are not truly elliptical but have flattened portions indicated in Fig. 13 at 35 and in Fig. 14 at 36, the contour having its smallest radius of curvature substantially at or near the plane 30.

From the foregoing description of my invention it will appear that I have provided a novel vehicle composed of three sections in which the two end sections are connected to the central section by means of brackets serving to transfer the weight of the central section and that of the end sections as well as the weight of the engine block and other units to the wheels of the vehicle, such brackets being of bell crank shape having horizontal arms extending above and beyond the axis of the front wheels, or the axis of the rear wheels respectively; that by so organizing the various elements of the body, the assembly of the vehicle is considerably facilitated and an opportunity is offered for the interposition of vibration-damping rubber cushions between the different elements; that the front body section and its supporting structure has a shape identical with that of the rear body section and its supporting structure, whereby the production and assembly is simplified and the number of spare parts reduced; that ample space is provided for the accommodation of the engine block, the spare tire, the fuel tank, luggage etc. and that the aerodynamic resistance will be a minimum, since the air current flowing past the body will be smoothly guided resulting in a minimum of turbulence.

While I have described my invention with reference to preferred embodiments thereof, I wish it to be clearly understood that the same is not limited to the details thereof but is capable of numerous modifications within the scope of the appended claims.

What I claim is:

1. In a motor car of the coupe type, the combination comprising an open body including a passenger space, a cap closing said passenger space, said cap including a roof portion, front, side and rear windows and a part of the side walls of the vehicle, substantially horizontal bars attached externally to said side walls of said cap and extending lengthwise of said body on either side thereof beyond said cap, and means for pivotally connecting said bars to said body, whereby said bars may be swung to lift said cap into opened position.

2. The combination set forth in claim 1 in which said means to pivotally connect said bars to said body are located near one end of said body.

3. The combination set forth in claim 1 in which said cap consists at least in part of a transparent plastic.

4. In a motor car of the coupe type, the combination comprising an open body including a passenger space, body means forming a cap shaped to close said passenger space and being at least partly transparent, substantially horizontal bars extending externally and lengthwise of said body on either side thereof and attached to said body means, and means for pivotally connecting said bars to said body, whereby said bars may be swung to lift said cap into opened position.

5. In a motor car of the coupe type, the combination comprising a tub-shaped central body section including a passenger space, a bracket of bell crank shape having downwardly extending arms attached to said central section and substantially horizontal arms extending in a direction away from said central section, a transverse bar carried by the ends of said horizontal arms, an end body section formed by a sheet metal shell carried by said bar and encasing said bracket, the ends of said bar projecting thru and out of said shell, substantially horizontal fender bars extending lengthwise of the body formed by said body sections on either side thereof and pivotally attached to the ends of said transverse bar, a cap on said central body section shaped to cover said passenger space and being at least partly transparent, said cap being attached to said fender bars and adapted to be swung jointly therewith into opened position.

6. In a motor car of the coupe type, the combination comprising an open streamlined body including a passenger space, a cap thereon shaped to cover said passenger space and being at least partly transparent, said cap including a roof, front, side and rear windows and a part of the side walls of the vehicle, said body being symmetrical with respect to its two central vertical planes extending longitudinally and transversely and being so shaped that all of its vertical cross-sections extending thru the intersection line of said central planes are substantially oval and symmetrical with respect to said intersection line, the diameters of maximum length of said cross-sections being located substantially within a common horizontal plane, a pair of bars extending lengthwise of said body externally on either side thereof within said horizontal plane and attached to said side walls of said cap, means for pivotally connecting said bars to said body, whereby said bars may be swung to lift said cap into opened position, and wheels carrying said body with said horizontal plane substantially tangential to the top of said wheels.

7. In a motor car of the coupe type, the combination comprising a central tub-shaped body section including a passenger space, a first bracket of bell crank shape having downwardly extending arms attached to the front end of said central section and substantially horizontal arms extending forwardly, a second bracket of bell crank shape having downwardly extending arms attached to the rear end of said central section and substantially horizontal arms extending rearwardly, two end body sections formed by sheet metal shells attached to said central body section and encasing said brackets, transverse bars carried by the ends of said horizontal arms, the ends of said bars being attached to said shells, the body composed of said central section and of said end sections being symmetrical with respect to its two central vertical planes extending longitudinally and transversely and being so shaped that all of its vertical cross-sections extending thru the intersection line of said central planes are substantially oval and symmetrical with respect to said intersection line, the diameters of maximum length of said cross-sections being located substantially within a common horizontal plane, a pair of fender bars extending lengthwise of said body on either side thereof within said horizontal plane, a cap on said central section adapted to cover said passenger space and being at least partly transparent, said cap being attached to said pair of fender bars, means to pivotally connect said fender bars to the ends of one of said transverse bars, whereby said fender bars may be swung upwardly to lift said cap into opened position affording access to said passenger space, and wheels carrying said body with said horizontal plane substantially tangential to their tops.

References Cited in the file of this patent

UNITED STATES PATENTS

| Number | Name | Date |
| --- | --- | --- |
| 1,642,971 | Rystedt | Sept. 20, 1927 |
| 1,868,382 | Coadou | July 19, 1932 |
| 1,953,515 | Smith | Apr. 3, 1934 |
| 2,074,158 | Avery | Mar. 6, 1937 |
| 2,256,885 | Bruss | Sept. 23, 1941 |
| 2,356,008 | Schafer | Aug. 15, 1944 |
| 2,398,541 | Leach | Apr. 16, 1946 |
| 2,533,548 | Backer | Dec. 12, 1950 |
| 2,533,752 | Alamagny | Dec. 12, 1950 |

FOREIGN PATENTS

| Number | Country | Date |
| --- | --- | --- |
| 859,864 | France | Sept. 20, 1940 |
| 872,026 | France | Jan. 29, 1942 |
| 940,185 | France | May 10, 1948 |
| 514,391 | Great Britain | Nov. 7, 1939 |
| 550,603 | Great Britain | Jan. 15, 1943 |

OTHER REFERENCES

Ser. No. 368,684, Barenyi et al. (A. P. C.), published May 25, 1943.